Figure 9:
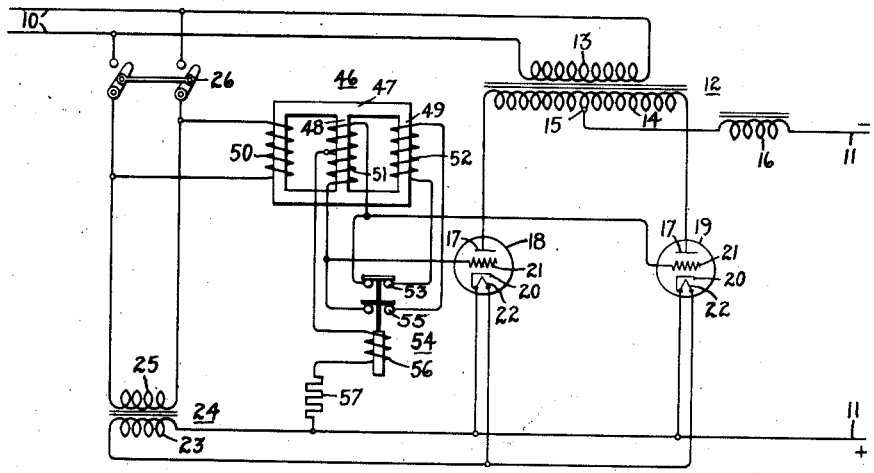

Sept. 1, 1942.   M. M. MORACK   2,294,759
ELECTRIC CONTROL SYSTEM
Filed Aug. 1, 1941   3 Sheets-Sheet 1
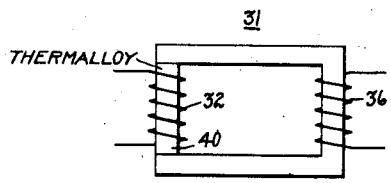
Fig. 2.
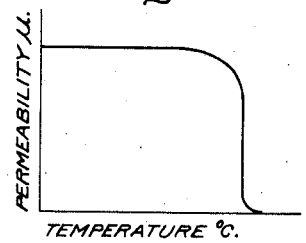
Fig. 3.
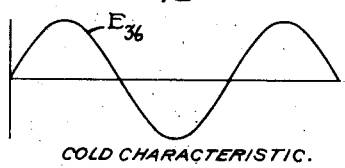
Fig. 4. COLD CHARACTERISTIC.
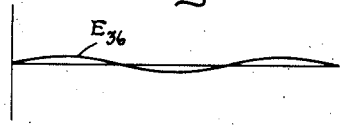
Fig. 5. HOT CHARACTERISTIC.
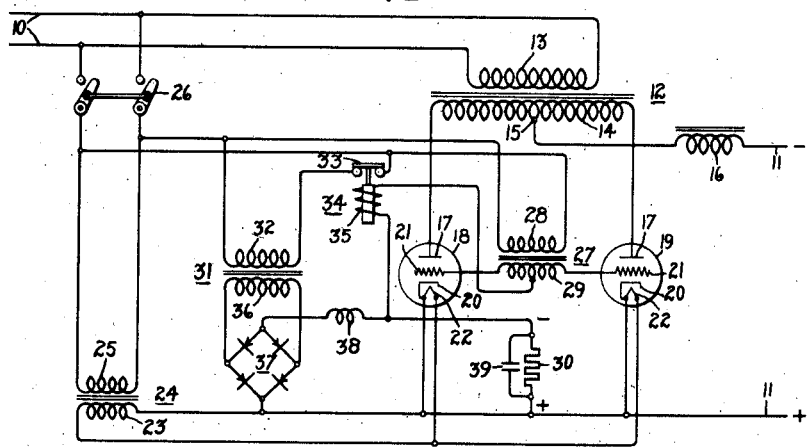
Fig. 1.
Inventor:
Marvin M. Morack,
by Harry E. Dunham
His Attorney.

Sept. 1, 1942.　　　M. M. MORACK　　　2,294,759
ELECTRIC CONTROL SYSTEM
Filed Aug. 1, 1941　　　3 Sheets-Sheet 2
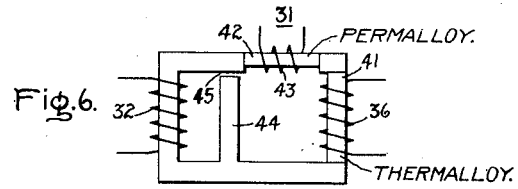
Fig. 6.
Fig. 7.
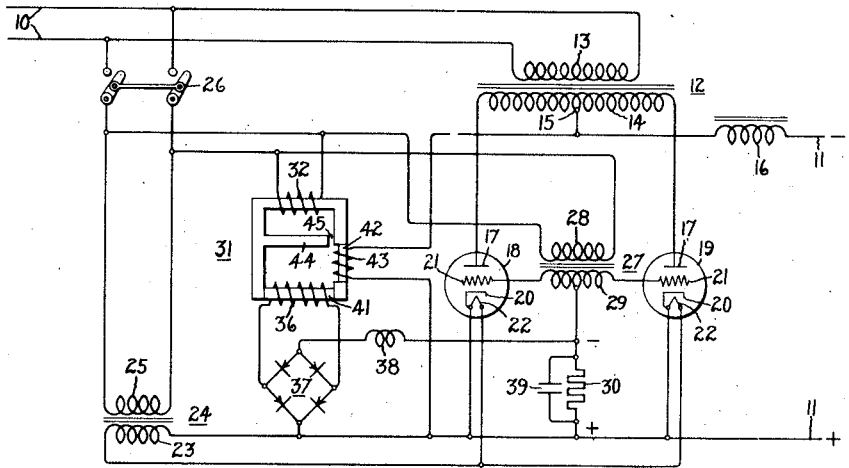
Fig. 8.
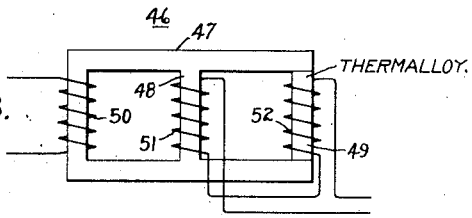
Fig. 10.
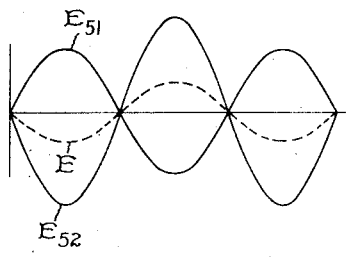
Fig. 11.
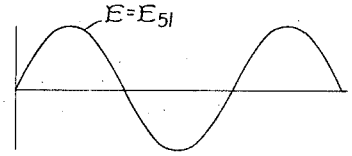
Inventor:
Marvin M. Morack,
by Harry E. Dunham
His Attorney.

Sept. 1, 1942.  M. M. MORACK  2,294,759
ELECTRIC CONTROL SYSTEM
Filed Aug. 1, 1941   3 Sheets-Sheet 3

Inventor:
Marvin M. Morack,
by Harry E. Dunham
His Attorney.

Patented Sept. 1, 1942

2,294,759

UNITED STATES PATENT OFFICE 2,294,759

ELECTRIC CONTROL SYSTEM

Marvin M. Morack, Scotia, N. Y., assignor to General Electric Company, a corporation of New York Application August 1, 1941, Serial No. 404,989

12 Claims. (Cl. 250—27)

My invention relates to electric control systems and more particularly to electric control systems which are well adapted for controlling and protecting electric discharge valves of the thermionic cathode type.

In many instances it is desirable to interpose a time delay between the energization of one part of a circuit and the energization of another part of the circuit. For example, in the operation of electric valves of the thermionic cathode type, such as those having incandescent cathodes or those provided with electron emitting cathodes heated from an independent heater, it is essential to the satisfactory operation of the valves that the cathodes shall have reached a normal operating temperature before the valves are energized to carry the current of the translating circuit in which they are connected. Various protective systems have been provided for protecting electric valves of this type against operation when the cathodes thereof are not at the proper operating temperature. However, most of these arrangements have involved the use of electro-mechanical time delay relays or other devices which are subject to disadvantages from the standpoint of cost or operation in connection with electric valve circuits.

It is an object of my invention to provide a new and improved control system particularly adapted for the protection of electric discharge valves of the thermionic cathode type.

It is another object of my invention to provide a new and improved control system including magnetic means having a marked decrease in permeability when it is heated to a critical temperature to effect a change in a control voltage after an interval of time.

It is another object of my invention to provide a new and improved protective system including material which undergoes a marked change in permeability at a critical temperature which effects a change in a control voltage after a predetermined time and automatically resets itself after the change in control voltage is effected.

It is a still further object of my invention to provide a new and improved protective system for electric discharge valves including a control electrode which renders the valves nonconductive for a predetermined time after the heating of the cathodes has been initiated.

In accordance with the illustrated embodiments of my invention, I employ an electromagnetic control device including a plurality of windings which are wound on a core structure including a section of material which undergoes a marked change in permeability at a critical temperature. In the electric valve circuit in which the devices are connected the primary winding is energized at the same time that the heater elements of the electric valves are energized and the section of material which undergoes a change in permeability with temperature is heated by the resistance of one of the windings associated with the core structure. When the permeability changes, the voltage induced in one of the windings changes appreciably and this change in voltage is utilized to effect a change in the excitation of the control members of the electric valves to change them from a non-conducting to a conducting state. In order that the electromagnetic device reset, means are provided for effectively deenergizing the winding associated with the section of material which changes its permeability with temperature in response to an operation of the device.

Figure 12:
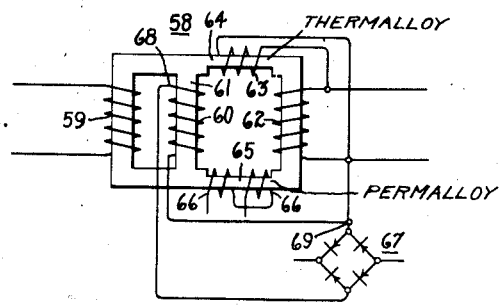
Figure 13:
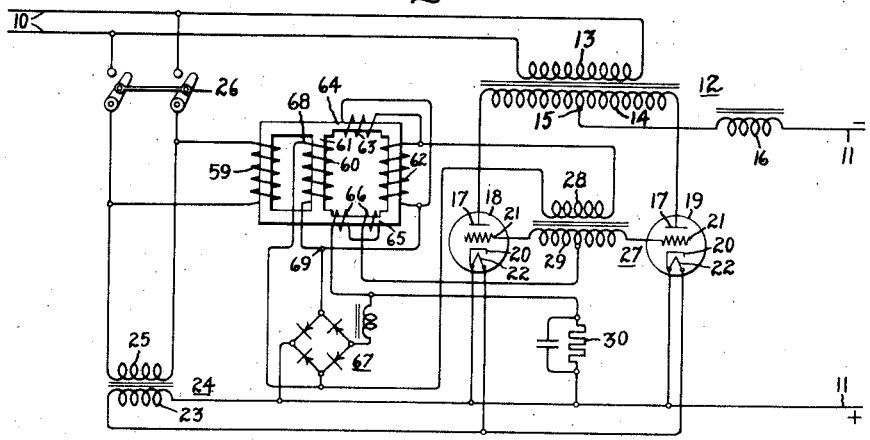

My invention will be better understood by reference to the following description taken in connection with the accompanying drawings and its scope will be pointed out in the appended claims. In the drawings, Fig. 1 is a schematic representation of one embodiment of my invention; Fig. 2 is a detail of a portion of the protective system of Fig. 1; Figs. 3, 4 and 5 show operating characteristics of the device of Fig. 2; Fig. 6 is a modified form of the protective device shown in Fig. 2; Fig. 7 shows the device of Fig. 6 embodied in an electric valve protective system similar to that illustrated in Fig. 1; Fig. 8 represents another modified protective device; Fig. 9 is a schematic representation of an electric valve circuit embodying the device of Fig. 8; Figs. 10 and 11 illustrate operating characteristics of the device illustrated in Fig. 8; Fig. 12 represents a modification of the device illustrated in Fig. 6, and Fig. 13 is a schematic representation of an electric valve circuit including the protective device of Fig. 12.

Referring now to the drawings, I have shown my invention embodied in a protective system for an electric valve circuit which interconnects an alternating current supply circuit 10 and a direct current load circuit 11. The electric valve system is connected as a single phase full wave rectifier and comprises a transformer 12 having the primary winding 13 thereof connected to be energized from the alternating current circuit 10. The secondary winding 14 is provided with a midtap 15 which is connected to the negative lead of the direct current circuit 11 through a suitable smoothing reactor 16. The end terminals of the transformer secondary winding 14 are connected to the anodes 17 of electric discharge valves 18 and 19 which are preferably of the type utilizing an ionizable medium such as a gas or vapor and comprising in addition to the anode 17, a cathode 20 and a control member or grid 21. The cathode may be directly heated or, as illustrated, may be heated by a separate filament 22. The cathodes of electric valves 18 and 19 are connected together and to the positive lead of the direct current circuit 11.

As is well understood by those skilled in the art, with this type of electric valve it is necessary that the cathode 20 be brought to a proper operating temperature before the valves are allowed to conduct current. Otherwise, the arc drop in the valves is very high and the cathodes are subjected to positive ion bombardment which results in the rapid deterioration of the cathode as an electron emitting body. In the particular embodiment illustrated in Fig. 1 the cathodes are brought to operating temperature by the separate filaments 22 which are connected in parallel and energized from the secondary winding 23 of a filament or cathode heater transformer 24 having the primary winding 25 thereof connected to the alternating current supply circuit 10 through a suitable switch 26. The control members 21 of the electric discharge valves 18 and 19 are energized by an alternating current control voltage by means of an excitation or grid transformer 27 having the primary winding 28 thereof connected in parallel with the primary winding 25 of the filament transformer 24. The secondary winding 29 of the grid transformer 27 has the end terminals thereof connected with the control members 21 and a midtap which is connected to one end of a biasing resistor 30. The other end of the biasing resistor is connected to the common cathode connection of the electric valves 18 and 19.

In accordance with the present invention an improved circuit is provided for maintaining the electric valves 18 and 19 nonconductive for a time after the switch 26 is closed to insure that the cathodes 20 are brought to proper operating temperature. In the particular embodiment illustrated in Fig. 1 the protective system comprises means for impressing a negative potential on the resistor 30 for a time after the switch 26 is closed.

Referring now to Fig. 1, the protective system includes a transformer 31 having the primary winding 32 thereof connected in parallel with the primary winding 25 of transformer 24 through the movable contact 33 of an electro-mechanical relay 34, having the operating coil 35 thereof connected between the midpoint of the excitation transformer secondary winding 29 and the cathodes 22 of the electric valves 18 and 19. The secondary winding 36 of the transformer 31 is connected to the input or alternating current terminals of a rectifier bridge circuit 37 which may be formed of four suitably poled contact rectifier units. The direct current or output terminals of the rectifier bridge circuit 37 are connected to the end terminals of the biasing resistor 30. A suitable filtering circuit including an inductance 38 connected in series and a capacitor 39 connected in parallel with the resistor are provided for smoothing out the direct current output of the rectifier bridge circuit 37. The transformer 31 of Fig. 1 is illustrated in more detail in Fig. 2 in which the windings have been designated by the same numbers used in Fig. 1.

Referring to Fig. 2, the transformer comprises a generally rectangular core having the leg 40 on which the winding 32 is wound formed of a metal having a variable permeability with temperature and preferably having a permeability temperature characteristic similar to that shown in Fig. 3 in which the permeability remains substantially constant until the metal reaches a predetermined temperature at which the permeability rapidly decreases to a very low value. Such material is available under the name Thermalloy. The remainder of the core is of ordinary iron punchings of the type commonly employed for transformer core structures. The winding 32 is preferably a rather high resistance winding to provide the necessary heating to bring the leg 40 to the critical temperature at which the permeability thereof changes rapidly. It will be apparent that by suitable design of the coil 32 and the heat insulation of the core structure, the time required to bring the leg 40 to the critical temperature may be controlled within fairly wide limits and coordinated with the time required to raise the temperature of the cathodes of valves 18 and 19 to the proper operating temperature.

In Fig. 4 the voltage $E_{36}$ appearing across the terminals of winding 36 when the core structure is cold is illustrated, and in Fig. 5 the voltage $E_{36}$ is illustrated for the same impressed voltage on winding 32 when the thermal permeable core 40 has reached its critical temperature. Thus it is seen that the output of the transformer 31 is reduced to substantially zero when the core leg 40 rises in temperature above the critical temperature of the material.

The operation of the protective system described in connection with Fig. 1 is substantially as follows. Upon closure of switch 26 the heaters 22 associated with the cathodes 20 are energized to raise the temperature of the cathodes to the proper operating level. The excitation transformer 27 and the transformer 31 are also energized. The alternating current impressed on the control members 21 by the secondary winding 29 of the transformer 27 has a phase relation which tends to render the electric valves conductive. However, the valves are maintained nonconductive for a predetermined time by a negative bias of suitable magnitude appearing across resistor 30 and derived from the output of the transformer 31 by means of the rectifier bridge 37. The transformer 31 is designed so that the negative bias derived when the leg 40 of the core thereof is below its critical temperature is of sufficient magnitude to maintain the electric valves 18 and 19 nonconductive. After an interval of time the core leg 40 heats up to the critical temperature and the voltage appearing across the input terminals of the rectifier bridge 37 is reduced as illustrated by the curves of Figs. 4 and 5. The negative bias across resistor 30 is now of such a small value that the valves are rendered alternately conductive and nonconductive by the alternating current voltage impressed on the control members 21 by the secondary winding 29 of the transformer 27. A permanent source of negative bias voltage may be connected in the cathode-to-control member circuit of electric valves 18 and 19 or separate switching means may be connected in circuit with winding 13 to maintain the valves nonconductive until after switch 26 has been closed. It will be apparent to those skilled in the art that suitable well known phase shifting means (not shown) may be inserted in circuit with the primary winding 28 of transformer 27 to control the magnitude of the voltage output of the electric valve translating apparatus. When the portion 40 of the core of transformer 31 is heated above its critical value the electric valves begin to conduct current. The coil 35 of the relay 34 is energized by the current rectified by the grid-to-cathode circuit of the electric valves and the contact 33 thereof is operated to its open circuit position. This relay is maintained in open position as long as the electric valves are conducting and with the contact 33 open the primary winding 32 of transformer 31 is deenergized. This permits the core leg 40 to cool so that it may be said to be thermally reset and ready to protect the electric valves in case the voltage is temporarily removed from the anode-cathode circuits thereof.

The arrangement just described in connection with Fig. 1 requires the use of an electro-mechanical relay to provide for the resetting of the thermal permeable transformer 31. In Figs. 6 and 7 I have shown a modification of my invention in which the electro-mechanical relay has been eliminated. With the exception of the construction of transformer 31 the system shown in Fig. 7 is substantially the same as that of Fig. 1 and the same reference numerals have been used to designate corresponding parts. In the arrangement shown in Fig. 6 the transformer 31 is of somewhat different construction. The secondary winding 36 is associated with a Thermalloy leg 41 of the transformer core structure and is the high resistance winding which provides the source of energy for heating the transformer core. The transformer core is also provided with a saturable section 42 preferably of a material having a saturation curve with a sharp knee or bend, such as Permalloy, and having a saturating winding 43 associated therewith. The core is also provided with an intermediate leg 44 having an air gap 45 to reduce the exciting current of the transformer 31 when the saturable section 42 is saturated.

Referring now to Fig. 7, the windings of transformer 31 are connected in somewhat the same manner as before with the exception that the primary winding 32 is connected directly in parallel with the primary winding 28 and transformer primary winding 25 instead of through the movable contact of a relay. The saturating winding 43 associated with the Permalloy section of the core structure is connected across the direct current output circuit of the electric valve rectifier circuit so that the Permalloy section is saturated when the electric valves are in operation. A better understanding of this embodiment of my invention may be had by a brief consideration of the operation of this system.

The operation of the embodiment of Fig. 7 is similar to that of Fig. 1. When the switch 26 is closed the cathode heating period is initiated and at the same time the valves are maintained non-conductive by the relatively large negative bias impressed on resistor 30 by the rectified secondary voltage of the winding 36. At this time the Permalloy section 42 is not saturated and the Thermalloy section 41 has relatively high permeability. After a time interval the temperature of the Thermalloy section rises sufficiently to reach the critical temperature and the permeability thereof decreases rapidly as shown in Fig. 3. This greatly reduces the negative bias across resistor 30 and allows the valves to conduct under the control of the alternating current voltage of the transformer 27. As soon as the valves conduct, the voltage of the direct current circuit is impressed across the saturating winding 43 associated with the Permalloy section 42 to completely saturate this portion of the transformer and effectively reduce the magnetic coupling between the windings 32 and 36 to a very low value. With substantially no voltage induced in the winding 36 the Thermalloy section cools and the transformer 31 will in this way be rendered in proper condition to protect the electric valves immediately if the circuit 10 is temporarily deenergized. As in the modification shown in Fig. 1, the electric valve translating apparatus may be controlled to change the voltage ratio between the alternating current and direct current circuits by means of any suitable phase shifter (not shown) in the circuit of the primary winding 28 and transformer 27.

In Fig. 8 I have shown a modification of the device of Fig. 2 having two secondary windings connected in series opposition and with one of these windings associated with a Thermalloy core section. Inasmuch as the details of the device of Fig. 8 differ considerably from those previously described, different numerals will be used to designate the parts of this device.

Referring to Fig. 8 the device illustrated generally by numeral 46 comprises a core structure 47 having an intermediate leg 48 and a Thermalloy leg 49. Mounted on one leg of the core is the primary winding 50, on the intermediate leg a winding 51, and on the Thermalloy leg a winding 52. The windings 51 and 52 are connected in series opposition.

In Fig. 10 I have shown the voltages $E_{51}$ and $E_{52}$ induced in the windings 51 and 52, respectively, when the Thermalloy section is at low temperature and the resultant of these voltages is shown by the dotted curve E. The winding 52 associated with the Thermalloy core section is a high resistance winding and after it has been energized for an interval of time the critical temperature of the core leg 49 is reached and the voltage induced in the winding 52 is reduced to very low value. The resultant voltage then becomes substantially $E_{51}$ as shown in Fig. 11. It is to be noted that this voltage is 180 degrees out of phase with the resultant voltage E of Fig. 10.

In Fig. 9 the arrangement shown in Fig. 8 has been embodied in a protective system for an electric valve converting apparatus. The parts of the converting system which are common to Figs. 1 and 7 have been designated by the same reference numerals as used in connection with those figures. The primary winding 50 of the transformer device 46 is connected in parallel with the transformer winding 25. The windings 51 and 52 have the end terminals thereof connected so that the voltages are in opposition. One end terminal of winding 51 is connected to the control member 21 of the valve 19 and with an end terminal of winding 52 through contact 53 of a relay 54. The other end terminal of winding 51 is connected with the control member 21 of valve 18 and to the other end terminal of winding 52 through contact 55 of relay 54. The coil 56 of the relay 54 is connected to be energized by the rectified grid current flowing in the circuit from the cathodes of the electric valves 18 and 19 through a resistor 57 to the midpoint of winding 51. With this arrangement it is seen that the voltage impressed on the electric valves with the relay deenergized is the resultant voltage of windings 51 and 52. After actuation of the relay the voltage of winding 51 alone is impressed on the control member 21.

The operation of the system illustrated in Fig. 9 is in general similar to that described in connection with Figs. 1 and 7. However, instead of utilizing a negative bias derived from the temperature responsive transformer the valves are rendered conductive by shifting the phase of the grid voltage 180 degrees. Thus when the switch 26 is first closed the resultant voltage impressed on the control member 21 of electric valves 18 and 19 corresponds to that of the curve E of Fig. 10. After a predetermined interval of time which is sufficient for the cathodes to reach the proper operating temperature the Thermalloy section of the device 46 reaches its critical temperature and the voltage appearing across winding 52 substantially disappears. This renders the voltage impressed upon the control member substantially that of curve $E_{51}$ in Fig. 11 which is slightly lagging in phase with respect to the anode-cathode voltages of the electric valves 18 and 19. The valves are then rendered conductive and in response to the rectified grid current the relay 54 is operated to disconnect the winding 52 completely from the circuit of winding 51 so that the Thermalloy section may cool and the device reset to protect the cathodes in the event that the voltage of source 10 is removed and then reapplied.

In Figs. 12 and 13 I have shown a system for protecting an electric valve apparatus from operation before the cathodes have reached the proper operating temperature which operates in the same general manner as the arrangement of Fig. 9 but which does not require an electro-mechanical relay and which may be readily operated with phase shifting circuits to control the voltage ratio of the supply and load circuits.

Referring now to Fig. 12, a transformer illustrated generally by the numeral 58 includes a primary winding 59, a secondary winding 60 wound on an intermediate leg 61 and a secondary winding 62. An additional winding 63 connected in parallel with winding 62 is wound on a portion 64 of the core made of Thermalloy or other material having the characteristic of rapidly losing its permeability at a critical temperature. The winding 63 is a fairly high resistance winding so that it produces the required heat to raise the temperature of the Thermalloy section. The transformer core is also provided with a Permalloy section 65 between the windings 60 and 62 and having reversely wound saturating windings 66 associated therewith. A rectifier bridge circuit 67 has the alternating current terminals thereof connected respectively to one terminal 68 of winding 60 and the common terminal 69 of the windings 62 and 63. The remaining terminals of windings 60 and 62 are connected together so that windings 60 and 62 are in series opposition.

In Fig. 13 the transformer arrangement of Fig. 12 is shown embodied in an electric valve protective system of the same general type as that described in Fig. 1. The direct current terminals of the rectifier bridge 67 are connected across the biasing resistor 30 and the alternating current terminals of the bridge are connected across the terminals of the winding 61. With this arrangement a permanent negative bias is impressed across resistor 30 dependent upon the magnitude of the voltage induced in the winding 60. The saturating windings 66 are connected in series with the midpoint of the excitation transformer and the biasing resistor so that the current in the grid circuit is utilized to saturate the Permalloy core section 65. It is apparent the winding 66 could be connected across the direct current output of the electric valve circuit if desired. The primary winding 28 of the excitation transformer 27 is connected across the end terminals of the series connected windings 60 and 62 which are designed to produce equal voltages and are connected in opposition. With this arrangement no alternating current voltage is impressed on the winding 28 as long as the winding 62 remains effectively coupled with the primary winding 59. A predetermined time after the switch 26 is closed the Thermalloy section 63 reaches its critical temperature, loses its permeability and the voltage induced in winding section 62 is reduced to a very low value. At this time the voltage of winding 60 is impressed on the primary winding 28 of the transformer 27. By properly designing the transformer 27 this voltage may be of sufficient magnitude to overcome the effect of the bias produced by the rectifier bridge 67. When the valves are conducting, the rectified current in the grid-to-cathode circuit flows in saturating winding 66 to maintain the voltage induced in winding 62 to a low value. The Thermalloy core 64 is thus allowed to cool so that the protective system is effectively reset for the next operation. As previously mentioned, a phase shifting device may be connected in circuit with the primary winding 59 to provide any desired phase relation between the alternating current voltage impressed on winding 28 and the phase of the voltage of circuit 10.

While I have shown and described various embodiments of my invention applied to an electric valve rectifier, it will be obvious to those skilled in the art that changes and modifications may be made without departing from my invention in its broader aspects, and I, therefore, aim in the appended claims to cover all changes and modifications that fall within the true spirit and scope of my invention.

What I claim as new and desire to secure by Letters Patent of the United States is:

1. In combination, an alternating current circuit, electric valve means associated with said circuit and including a thermionic cathode and a control member, means for supplying energy to said cathode to raise the temperature thereof to a normal operating value, and means energized simultaneously with said last mentioned means comprising a transformer having a core including a portion of magnetic material which undergoes a marked reduction in permeability at a critical temperature, said transformer having a primary winding and a secondary winding at least one of said windings having sufficient resistance to raise the temperature of said section of the core above its critical temperature, and means for impressing a voltage dependent upon the voltage of said secondary winding upon the grid-to-cathode circuit of said electric valve means to maintain said valve means nonconductive until said thermionic cathode has reached its normal operating temperature.

2. In combination, an electric translating circuit including electric valve means having a thermionic cathode and a control member, means including a transformer having a core section of temperature sensitive magnetic material, a primary winding and a secondary winding, an electric circuit for heating said cathode, a source of voltage, means connecting said last mentioned circuit and the primary winding of said transformer to said source of voltage, and means responsive to the voltage of said secondary winding and connected in the cathode-to-control member circuit of said valve means for rendering said valve means nonconductive until the permeability of said temperature sensitive core section reaches a predetermined value.

3. In combination, an electric translating circuit including electric valve means having a thermionic cathode and a control member, a transformer having a core structure including a section of temperature sensitive magnetic material, a secondary winding associated with said core structure, and means for impressing the voltage derived from said secondary winding upon the control member of said electric valve means to render said electric valve means nonconductive, the voltage of said secondary winding being dependent upon the permeability of said temperature sensitive core structure and reduced to such value when said core structure reaches a critical temperature that said valves are rendered conductive.

4. In combination, an electric translating circuit including electric valve means having a thermionic cathode and a control member and an electromagnetic device having a core section of magnetic material which undergoes a marked change in permeability at a particular temperature and a plurality of windings associated with said core, means for energizing one of said windings, and means responsive to the voltage of the other of said windings for maintaining the potential of said control member below its critical value and thereby render said valve means nonconductive until said cathode reaches substantially its normal operating temperature.

5. An electromagnetic device comprising a core structure, a portion of said structure being formed of magnetic material which undergoes a marked change in permeability with changes in temperature, a plurality of windings associated with said core structure, one of said windings being associated with said section of said core structure, and means responsive to the change in permeability of said section due to changes in temperature thereof for effecting substantial deenergization of the winding associated with said section of said core.

6. An electromagnetic device comprising a core structure having a section formed of material which undergoes a marked change in permeability with changes in temperature, a plurality of windings associated with said core structure including a primary winding, a secondary winding associated with said section and a saturating winding, a circuit for energizing said saturating winding, and means responsive to a change in permeability of said core section due to changes in temperature thereof for controlling said last mentioned circuit to saturate a portion of said core structure and effectively deenergize said secondary winding thereby allowing said temperature permeable section to cool and said electromagnetic device to reset.

7. An electromagnetic device comprising a core structure including a section of material which undergoes a large change in permeability at a given temperature and a second section of material having a high permeability at low flux densities and a sharp-kneed saturation curve, a primary winding associated with said core structure, a secondary winding associated with said first named section, a saturating winding associated with said second named section of said core structure, means for energizing said primary winding, and means responsive to a change in permeability of said first named section for effecting energization of said saturating winding and substantial magnetic isolation of said primary and secondary windings to permit said first named section to cool and said electromagnetic device to reset.

8. An electromagnetic device comprising a core structure including a section of material which undergoes a marked change in permeability at a particular temperature, a winding associated with said core structure for controlling the temperature of said section, a saturable section associated with said core structure, and means for saturating said last named section to effect substantial deenergization of said winding in response to a change in permeability of said first named section to permit said section to cool and reset said electromagnetic device.

9. An electromagnetic device comprising a core structure having a primary winding and a secondary winding associated therewith, said core structure including a section of material which undergoes a marked decrease in permeability at a critical temperature and another section of material having high permeability at low flux density, control windings associated with said last named section of said core structure, means responsive to energization of said secondary winding for increasing the temperature of said first named section to effectively isolate said secondary winding a predetermined time after energization thereof, and means responsive to a decrease in permeability of said first named section resulting from the heating thereof for producing saturation of said high permeability section to isolate said secondary winding after said first named section has reached its critical temperature and effectively deenergize the temperature increasing means associated with said temperature permeable section to allow said electromagnetic device to reset.

10. An electromagnetic device comprising a core structure, a primary winding and a plurality of secondary windings associated with said core structure, said secondary windings being wound on said core and connected in opposition so that the voltages induced therein are of different magnitudes and oppose each other, said core structure including a section which undergoes a marked decrease in permeability at a critical temperature, said windings being associated with said core structure so that the voltage of the winding which predominates substantially disappears when said section reaches the critical temperature and the phase of the resultant voltages of said secondary windings is reversed.

11. An electromagnetic device comprising a core providing a magnetic circuit and including a section which undergoes an abrupt change in permeability at a particular temperature, a plurality of windings associated with said core, and means for energizing one of said windings to produce a flux in said core for inducing a voltage in the other of said windings and for initiating heating of said section whereby the voltage of said other winding is reduced abruptly after the expiration of the period of time required for heating of said section to said particular temperature.

12. An electromagnetic device comprising a core providing a magnetic circuit and including a section which undergoes an abrupt change in permeability at a particular temperature, a plurality of windings associated with said core, means for energizing one of said windings to produce a flux in said core for inducing a voltage in the other of said windings and for initiating heating of said section whereby the voltage of said other winding is reduced abruptly after the expiration of the period of time required for heating of said section to said particular temperature, and means operable in response to the change in flux in said core when said section reaches said particular temperature for terminating the heating of said section so that said device is reset.

MARVIN M. MORACK.